United States Patent
Morris et al.

(10) Patent No.: US 9,447,828 B2
(45) Date of Patent: Sep. 20, 2016

(54) CARRIER AND MOUNT

(71) Applicant: MERITOR HEAVY VEHICLE BRAKING SYSTEMS (UK) LIMITED, Cwmbran, Gwent (GB)

(72) Inventors: Jason Morris, Gwent (GB); Alexander George Howard, Gwent (GB)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 0 days.

(21) Appl. No.: 14/645,880

(22) Filed: Mar. 12, 2015

(65) Prior Publication Data

US 2015/0184705 A1    Jul. 2, 2015

Related U.S. Application Data

(63) Continuation of application No. 13/906,603, filed on May 31, 2013, now abandoned.

(30) Foreign Application Priority Data

Jul. 24, 2012  (EP) ..................................... 12177731

(51) Int. Cl.
| | |
|---|---|
| *F16D 65/00* | (2006.01) |
| *F16D 55/02* | (2006.01) |
| *F16D 65/095* | (2006.01) |
| *F16D 55/22* | (2006.01) |
| *F16D 55/00* | (2006.01) |

(52) U.S. Cl.
CPC .......... *F16D 65/0056* (2013.01); *F16D 55/02* (2013.01); *F16D 55/22* (2013.01); *F16D 65/095* (2013.01); *F16D 2055/0008* (2013.01);

(Continued)

(58) Field of Classification Search
CPC ................. F16D 2065/134; F16D 2065/1356; F16D 2069/0433
USPC .............................................. 188/73.39, 72.1
See application file for complete search history.

(56) References Cited

U.S. PATENT DOCUMENTS

| | | | |
|---|---|---|---|
| 2004/0126525 A1* | 7/2004 | Schnabel ......... | F02M 35/10144 428/36.9 |
| 2006/0237267 A1 | 10/2006 | Brown, II et al. | |

(Continued)

FOREIGN PATENT DOCUMENTS

| | | |
|---|---|---|
| DE | 4303417 A1 | 8/1994 |
| DE | 102005052951 A1 | 5/2007 |

(Continued)

OTHER PUBLICATIONS

European Search Report for corresponding Application No. 12177731.2, mailed Mar. 25, 2013, 9 pages.

*Primary Examiner* — Vishal Sahni
(74) *Attorney, Agent, or Firm* — Brooks Kushman P.C.

(57) ABSTRACT

A carrier and mount assembly for a heavy vehicle disc brake. The assembly includes a carrier having a first location formation formed therein, a mount having a second location formation formed therein, wherein the second location formation is aligned with the first location formation, and wherein the carrier is mounted to the mount via two or more fasteners that extend in a direction substantially parallel to a direction of insertion or removal of a friction element into or from the carrier. There is also a locator positioned in the first and second location formations to enable the carrier and mount to be assembled in the correct position, wherein the locator is at least a close fit to the first and second location formations.

20 Claims, 13 Drawing Sheets

(52) U.S. Cl.
CPC .. *F16D2250/0084* (2013.01); *Y10T 29/49826* (2015.01); *Y10T 29/49947* (2015.01)

(56) References Cited

U.S. PATENT DOCUMENTS

| | | | |
|---|---|---|---|
| 2008/0135352 A1* | 6/2008 | Bell | F16D 55/22 188/73.39 |
| 2008/0247843 A1* | 10/2008 | Shluzas | F16B 15/06 411/369 |
| 2014/0027214 A1* | 1/2014 | Morris | F16D 65/095 188/73.31 |

FOREIGN PATENT DOCUMENTS

| | | |
|---|---|---|
| DE | 102008047913 B3 | 4/2010 |
| EP | 0971144 A2 | 1/2000 |
| EP | 1437521 A1 | 7/2004 |
| EP | 1637762 A2 | 3/2006 |
| WO | 2006007892 A1 | 1/2006 |
| WO | 2008079086 A1 | 7/2008 |

* cited by examiner

CARRIER AND MOUNT

CROSS-REFERENCE TO RELATED APPLICATIONS

This application is a continuation of U.S. application Ser. No. 13/906,603 filed May 31, 2013, which, claims priority to European Patent Application No. 12177731.2 filed Jul. 24, 2012, the disclosure of which is incorporated in its entirety by reference herein.

TECHNICAL FIELD

The present invention relates to a method of mounting a carrier of a disc brake to a mount, and/or a carrier and mount assembly.

BACKGROUND

Disc brakes, for example air actuated disc brakes are commonly used for braking heavy vehicles such as trucks, buses and coaches. There are many types of disc brakes available. An example of one of the many types of pneumatic disc brakes is shown in FIG. 1.

Referring to FIG. 1, the disc brake 110 has a carrier 112 that carries a caliper 114. The carrier also carries friction elements 122 such that one friction element is positioned on each side of a rotor 116 of the disc brake 110. An air actuator is provided for moving an inboard friction element into frictional contact with the rotor 116 via an actuator mechanism (not shown). The rotor 116 is fixed in an inboard-outboard direction, so that when the inboard friction element is pushed towards and contacts the rotor 116, further pushing of the inboard friction element towards the rotor 116 causes the caliper 114 to move inboard. As the caliper 114 moves inboard it moves the outboard friction element towards the rotor 116 clamping the rotor 116 between the outboard and the inboard friction elements 122 and thereby effecting braking by frictionally inhibiting rotation of the rotor 116.

In use, the disc brake is mounted to an axle of a vehicle. This may be achieved by connecting the carrier to a mount on the axle, typically via a bracket welded to the axle. Bolts arranged parallel to an axis of rotation of the rotor secure the carrier to the mount.

Alternatively, for example where an axle has a flange for connection to a drum brake, the carrier is generally attached to a separate mount, often referred to as an adapter plate, and the separate mount is connected to the flange. Axial mounting may result in difficulty in accessing bolts to assemble/disassemble the brake, as well as increase the weight of the brake due to the material doubling at the interface between the mount and carrier. Accordingly, tangential mounting may be used, i.e. the carrier is mounted to the mount via fasteners (e.g. bolts) that extend in a direction tangential to the rotor and substantially perpendicular to the axis of rotation of the rotor.

Features of the carrier and mount generally enable the carrier to be accurately mounted to the axle in a direction A parallel to an axis of rotation of the rotor 116. However, there may be difficulties aligning the carrier with respect to a rotor of a disc brake. Referring to FIG. 2, misalignment of the carrier can result in the rotor 116 and friction element 122 being misaligned, such that the friction element 122 is spaced from the rotor by a greater distance 121 at one side of the friction element than at an opposite side of the friction element. This misalignment can result in taper (i.e. uneven) pad wear and/or non-uniform loading of the caliper mechanism and components. This may be particularly problematic in brakes where bolts secure the carrier to the mount in a tangential or chordal direction (so-called tangential mount carriers), as there may be no overlap of faces of the carrier and mount in the axial direction to aid alignment. This problem is particularly problematic in heavy vehicles rather than lighter vehicles because the larger dimensions of heavy vehicle brakes tend to amplify the effects of any misalignment.

SUMMARY

The present invention seeks to alleviate problems associated with the prior art.

In a first aspect of the invention there is provided a carrier and mount assembly for a heavy vehicle disc brake, the assembly comprising: a carrier having a first location formation formed therein, a mount having a second location formation formed therein, wherein the second location formation is aligned with the first location formation, and wherein the carrier is mounted to the mount via two or more fasteners that extend in a direction substantially parallel to a direction of insertion or removal of a friction element into or from the carrier; and a locator positioned in the first and second location formations to enable the carrier and mount to be assembled in the correct position, wherein the locator is at least a close fit to the first and second location formations.

The mounting assembly of the first aspect has been found to ease alignment of the carrier to the mount so as to ensure correct alignment of the carrier to the rotor.

A close fit may be a transitional fit or an interference fit. For example, when the close fit is a transitional fit, the fit may have a clearance of between 0 mm to 0.04 mm.

The carrier may be seated on the mount such that planar contacting surfaces of the carrier and mount extend in a plane substantially perpendicular to a plane of a rotor and parallel to an axis of rotation of a rotor of a disc brake.

The first location formation and the second location formation may be positioned to extend in a direction substantially parallel to a direction of insertion or removal of a friction element into or from the carrier.

Only one locator may be provided in the carrier and mount assembly. Provision of only one locator has been found to ease assembly whilst sufficiently permitting correct alignment of the carrier and mount to reduce taper pad wear.

The first location formation is a hole formed in the carrier and the second location formation is a hole formed in the mount, and the locator is a peg positioned in the first location formation and the second location formation.

In the present application a hole defines an enclosed channel that extends fully or partially through a component. For example, a hole may have a circular or oval cross section.

The peg may be an elongate cylindrical member. The peg may comprise a knurled portion positioned in one of the carrier and the mount. The peg may comprise a portion dimensioned to be an interference fit with the carrier. For example, the knurled portion may be dimensioned to be an interference fit with one of the carrier and the mount.

The carrier may comprise two holes arranged such that one hole is positioned on either side of a plane defined by an axis extending substantially parallel to a direction of insertion or removal of a friction element into or from the carrier, and an axis of rotation of a rotor of a disc brake. The mount may comprise two holes positioned to be substantially coaxial with the two holes of the carrier. One of the two or more fasteners may extend through each of the holes for mounting the carrier to the mount. For example, the fasteners may be threaded bolts and the two holes may be threaded to mate with the threaded bolt.

The carrier may comprise two further holes arranged such that one further hole is positioned on either side of a plane defined by an axis extending substantially parallel to a direction of insertion or removal of a friction element into or from the carrier, and an axis of rotation of a rotor of a disc brake. The mount may comprise two further holes positioned to be substantially coaxial with the two further holes of the carrier. One of the two or more fasteners may extend through each of the further holes for mounting the carrier to the mount. For example, the fasteners may be threaded bolts and the two further holes may be threaded to mate with the threaded bolt.

The two holes, the two further holes, and the first and second location formations may be arranged in line in a direction substantially perpendicular to an axis of rotation of a rotor of a disc brake, and substantially perpendicular to a direction substantially parallel to a direction of insertion or removal of a friction element into or from the carrier.

The first location formation and the second location formation may be positioned between one of the holes and one of the further holes.

The carrier and mount assembly may comprise a location hole formed in the carrier and a location hole formed in the mount. The location hole in the carrier and the location hole in the mount may have similar dimensions to the first and second location formation. The location hole may be on an opposite side to the first and second location formations of a plane defined by an axis extending substantially parallel to a direction of insertion or removal of a friction element into or from the carrier, and an axis of rotation of a rotor of a disc brake.

In a second aspect the invention provides a method of mounting a carrier of a disc brake to a mount, the method comprising: providing a carrier to be mounted having a first location formation; providing a mount having a second location formation alignable with the first location formation; positioning a locator in the first and second location formation to support the carrier in alignment with respect to the mount so as to correctly position the carrier with respect to the mount; and mounting the carrier to the mount using fasteners that in a mounted position extend in a direction substantially parallel to a direction of insertion or removal of a friction element into or from the carrier; wherein the first and second location formations are formed to be a close fit with the locator.

The first location formation may be a hole in the carrier and the second location formation may be a hole in the mount, and the first and second location formations may be positioned to be coaxial when the carrier is mounted to the mount. The locator may be a peg, and the method may comprise positioning the peg in the hole in the carrier, and then mounting the carrier with the peg to the mount.

Two holes may be provided in the carrier and mount positioned to be on either side of a rotor, and the two holes may be dimensioned for receipt of the locator. The method may comprise positioning the locator in only one of the two holes of the carrier and mount, and then mounting the carrier to the mount.

Wherein the carrier is mounted to the mount via a fastener at a position near the locator and a position further from the locator. The step of mounting the carrier to the mount may comprise fastening the carrier to the mount at a position further from the locator, and subsequently at a position near the locator.

The carrier, mount and locator may be the carrier, mount and locator of the carrier and mount assembly of the first aspect.

In a third aspect of the present invention there is provided a method of mounting a carrier of a disc brake to a mount, the method comprising: providing a carrier or caliper to be mounted having a first location formation; providing a mount having a second location formation alignable with the first location formation; positioning a locator in the first and second location formation to support the carrier or caliper in alignment with respect to the mount so as to correctly position the carrier or caliper with respect to the mount; mounting the carrier or caliper to the mount; and removing the locator from the location formation for normal use of the disc brake.

The method of the present invention permits the carrier to be correctly positioned with respect to the mount in both a direction parallel to an axis of rotation of a rotor of a disc brake and in a plane parallel to a plane of a rotor of a disc brake. This means that when the disc brake having said mount and carrier are mounted to an axle of a vehicle, friction elements of the disc brake are substantially aligned with the rotor alleviating the above described problem of taper pad wear and non-uniform loading of the caliper mechanism and components.

Throughout the present application directions of features of the mount and/or carrier are referred to with respect to a rotor of a disc brake of which the carrier may be a component thereof. The directions are shown by arrows in FIG. 1 and later described FIG. 3. Direction A is a direction through an axis of rotation of a rotor of a disc brake and is substantially perpendicular to a plane substantially parallel to a planar face of the rotor; a direction T is a direction tangential to a to a circle described by rotation of a rotor of a disc brake and generally parallel or aligned with a direction of insertion or removal of a friction element into or from the carrier; and a direction R is a direction substantially perpendicular to both of the axes defined by direction A and direction T respectively (i.e. is generally aligned with a width of the carrier).

The first location formation may be positioned in alignment with the second location formation, and then the locator may be positioned in the first and second location formation. Alternatively, the first and second location formations may be positioned in substantial alignment, and the step of positioning the locator in the first and second location formation may correctly align the first and second location formations.

The mount may be directly connected to an axle, for example by welding, or may be connected to a flange of an axle, for example using bolts. Alternatively, the mount may be part of a steering knuckle on a steered axle.

The locator may be a single locator positionable in both the first and the second location formations. The locator may be a dowel.

The location formations may be locator channels. The location formations may comprise a non-threaded surface. For example, the location formations may comprise a substantially smooth surface.

The first and/or second location formation may be provided on a surface of the carrier and/or mount, respectively. The first and/or second location formation may be provided entirely on a surface of the carrier and/or mount, respectively.

The first and second location formations may be positioned in co-axial alignment. Such alignment permits a locator such as a dowel to be more easily positioned in both the first and second location formation.

The carrier may be attached to the mount using two or more fasteners. Alternatively, the carrier may be attached to the mount by welding.

The first or second location formation may be a groove formed in a respective surface of the carrier and/or mount. The first and/or second location formations may be linear grooves. The groove may have a substantially semi-circular cross section.

The first location formation may be a groove positioned to be aligned and in opposition to the second location formation to form a conjoined location formation, to receive the locator. The locator may be a dowel, and the dowel may have a similar cross-section to the cross-section of the conjoined location formation. The first and second location formations may be provided to be in a direction in the plane of rotation of a rotor of the disc brake and substantially perpendicular to an axis through a center of rotation of a rotor and substantially perpendicular to a direction tangential to a rotation of a rotor. The method may comprise providing a first seat adjacent one or more sides of the first location formation and a second seat adjacent one or more sides of the second location formation, and positioning the first and second seats in opposition and abutment. The seats may be formed by machining a surface of the mount and carrier. The seat can further improve the accuracy with which the carrier can be positioned with respect to the mount.

The seats may be in a plane defined by directions A and T, i.e. they may be chordal with respect to a circle described by rotation of the rotor, and may further be provided either side of an axle, and may be co-planar The locator may be a component of a clamping device.

Alternatively, the first location formation may be a hole formed in the carrier and the second location formation may be a hole formed in the mount.

The first and/or second location formation may have a non-circular cross-section. In exemplary embodiments, the first and/or second location formation may have a directional component in a direction corresponding to a plane of rotation of a rotor of the disc brake.

The method may comprise coaxially aligning a bore formed in the carrier and the mount for receiving a fastener for mounting, with the first and/or second location formation. The first and/or second location formation may comprise a slot having a directional component in a direction corresponding to a plane of rotation of a rotor of the disc brake. For example, the slot may be rectangular or oval. In such embodiments, the locator may be a dowel having a rectangular or oval cross section. Alternatively, the locator may be a dowel having a cross section substantially similar to the cross section of the hole.

The first location formation may extend partially through the carrier and the second location formation may extend entirely through the mount, or the second location formation may extend partially through the carrier and the first location formation may extend entirely through the mount. Alternatively, the first location formation may extend entirely through the carrier and the second location formation may extend entirely through the mount.

The step of mounting the carrier to the mount may use a fastener. In such embodiments, the method may comprise the step of using the fastener to drive the locator through the hole as the fastener is fastened to the mount and carrier. The step of mounting the carrier to the mount may comprise using two or more fasteners, for example four fasteners.

In exemplary embodiments, the hole may be dimensioned to be a close fit with the locator. The locator may be a pin. The locator may be a bolt. In such embodiments, the method may comprise screwing the bolt into the first and second location formations.

A hole may define the first and/or second location formation. The hole defining the first location formation may extend entirely through the carrier, and/or the hole defining the second location formation may extend entirely through the mount.

The first and second location formations may be positioned to be in a direction tangential to a direction of rotation of a rotor of a disc brake and generally aligned with the abutments on the carrier to support end faces of the friction elements. Alternatively, the first and second location formations may be positioned to be in a tangential direction of rotation of a rotor and parallel to a plane defined by a face of a rotor of a disc brake, but normal abutments on the carrier to support end faces of the friction elements.

The first and second location formations may be formed by milling or broaching.

In a fourth aspect of the present invention there is provided a method of mounting a carrier of a disc brake to a mount, the method comprising: providing a carrier to be mounted having a first location formation; providing a mount having a second location formation alignable with the first location formation; positioning a locator in the first and second location formation to support the carrier in alignment with respect to the mount so as to correctly position the carrier with respect to the mount; and mounting the carrier to the mount; wherein the first and the second location formations are axial channels and are positioned to be in a direction parallel to a plane of rotation of a rotor of the disc brake and transverse to a direction tangential to a rotation of the rotor.

The first and second location formations may be positioned to be substantially perpendicular to a direction tangential to a rotation of the rotor.

The locator may remain positioned in the first and/or second location formation during normal use of the disc brake. Alternatively, the locator may be removed from the first and/or second location formation for normal use.

As will be appreciated by a person skilled in the art, many of the optional features of the third aspect may be used in combination with the method of the fourth aspect.

In a fifth aspect of the present invention there is provided a method of mounting a carrier of a disc brake to a mount, the method comprising: providing a carrier to be mounted having a first location formation; providing a mount having a second location formation alignable with the first location formation; positioning a locator in the first and second location formation to support the carrier in alignment with respect to the mount so as to correctly position the carrier with respect to the mount; and mounting the carrier to the mount using two or more fasteners; wherein the first and second location formations are formed coaxially with a bore for receiving the two or more fasteners.

The locator may remain positioned in the first and/or second location formation during normal use of the disc brake. Alternatively, the locator may be removed from the first and/or second location formation for normal use.

As will be appreciated by a person skilled in the art, many of the optional features of the third aspect may be used in combination with the method of the fifth aspect.

In a sixth aspect of the present invention there is provided a method of mounting a carrier of a disc brake to a mount, the method comprising: providing a carrier to be mounted having a first location formation; providing a mount having a second location formation alignable with the first location formation; positioning a locator in the first and second location formation to support the carrier in alignment with respect to the mount so as to correctly position the carrier with respect to the mount; and mounting the carrier to the mount; wherein the first and second location formations are formed to be a close fit with the locator.

The locator may remain positioned in the first and/or second location formation during normal use of the disc brake. Alternatively, the locator may be removed from the first and/or second location formation for normal use.

As will be appreciated by a person skilled in the art, many of the optional features of the third aspect may be used in combination with the method of the sixth aspect.

In a seventh aspect of the present invention there is provided a carrier or caliper and a mount assembly, the carrier or caliper having a first location formation formed therein, and the mount having a second location formation formed therein, the first and second location formations being alignable such that during assembly of the carrier or caliper and mount a locator can be positioned in the first and second location formation to enable the carrier or caliper and mount to be assembled in the correct position, and the locator can be removed from the assembly during normal use.

As will be appreciated by a person skilled in the art, many of the optional features of the method of the third aspect where applicable can be combined with the assembly of the seventh aspect.

In an eighth aspect of the present invention there is provided a carrier or caliper and a mount assembly, the carrier or caliper having a first location formation formed therein, and the mount having a second location formation formed therein, the first and second location formations being alignable such that during assembly of the carrier or caliper and mount a locator can be positioned in the first and second location formation to enable the carrier or caliper and mount to be assembled in the correct position, wherein the first and the second location formations are axial channels and are positioned to be in a direction parallel to a plane of rotation of a rotor of the disc brake and transverse to a direction tangential to a rotation of the rotor.

As will be appreciated by a person skilled in the art, many of the optional features of the method of the fourth aspect where applicable can be combined with the assembly of the eighth aspect.

In a ninth aspect of the present invention there is provided a carrier and a mount assembly, the carrier having a first location formation formed therein, and the mount having a second location formation formed therein, the first and second location formations being alignable such that during assembly of the carrier and mount a locator can be positioned in the first and second location formation to enable the carrier and mount to be assembled in the correct position; and the assembly comprising two or more fasteners attaching the carrier to the mount, and wherein the first and second location formations are formed coaxially with a bore for receiving the two or more fasteners.

As will be appreciated by a person skilled in the art, many of the optional features of the method of the fifth aspect where applicable can be combined with the assembly of the ninth aspect.

In a tenth aspect of the present invention there is provided a carrier and a mount assembly, the carrier having a first location formation formed therein, and the mount having a second location formation formed therein, the first and second location formations being alignable such that during assembly of the carrier and mount a locator can be positioned in the first and second location formation to enable the carrier and mount to be assembled in the correct position, and wherein the first and second location formations are formed to be a close fit with the locator.

As will be appreciated by a person skilled in the art, many of the optional features of the method of the sixth aspect where applicable can be combined with the assembly of the tenth aspect.

BRIEF DESCRIPTION OF THE DRAWINGS

Embodiments of the present invention will now be described with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
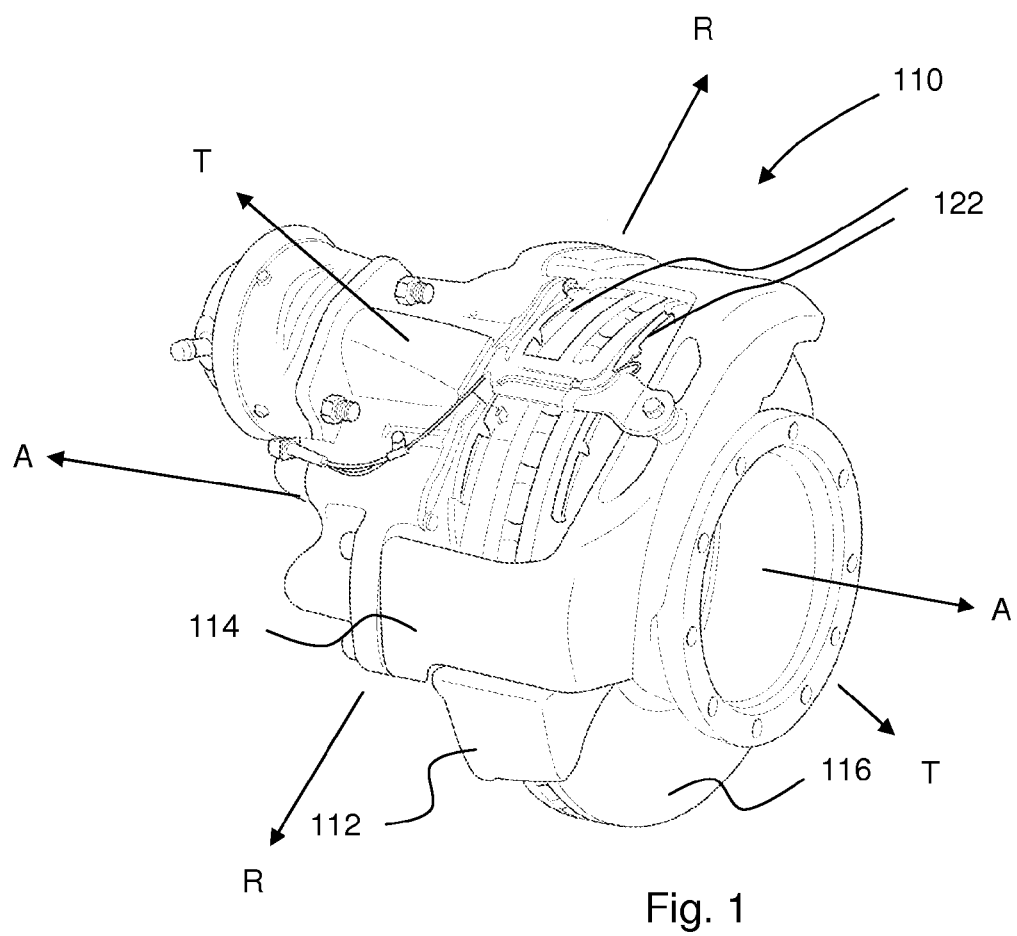
FIG. 1 shows a perspective view of a disc brake of the prior art.
Figure 2:
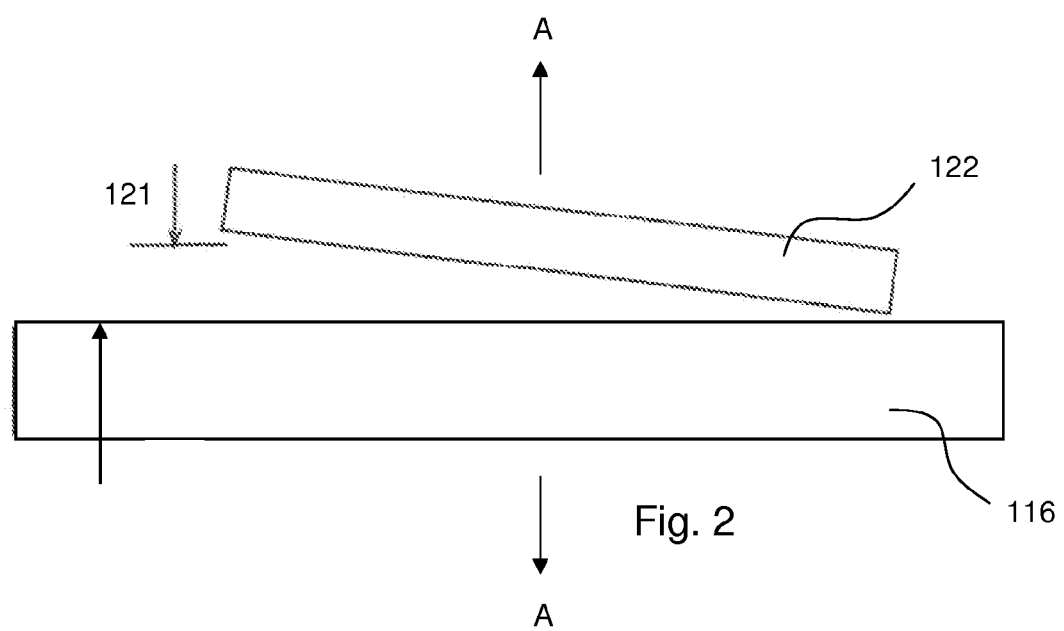
FIG. 2 shows a schematic plan view of a rotor and friction element of a disc brake of the prior art.
Figure 3:
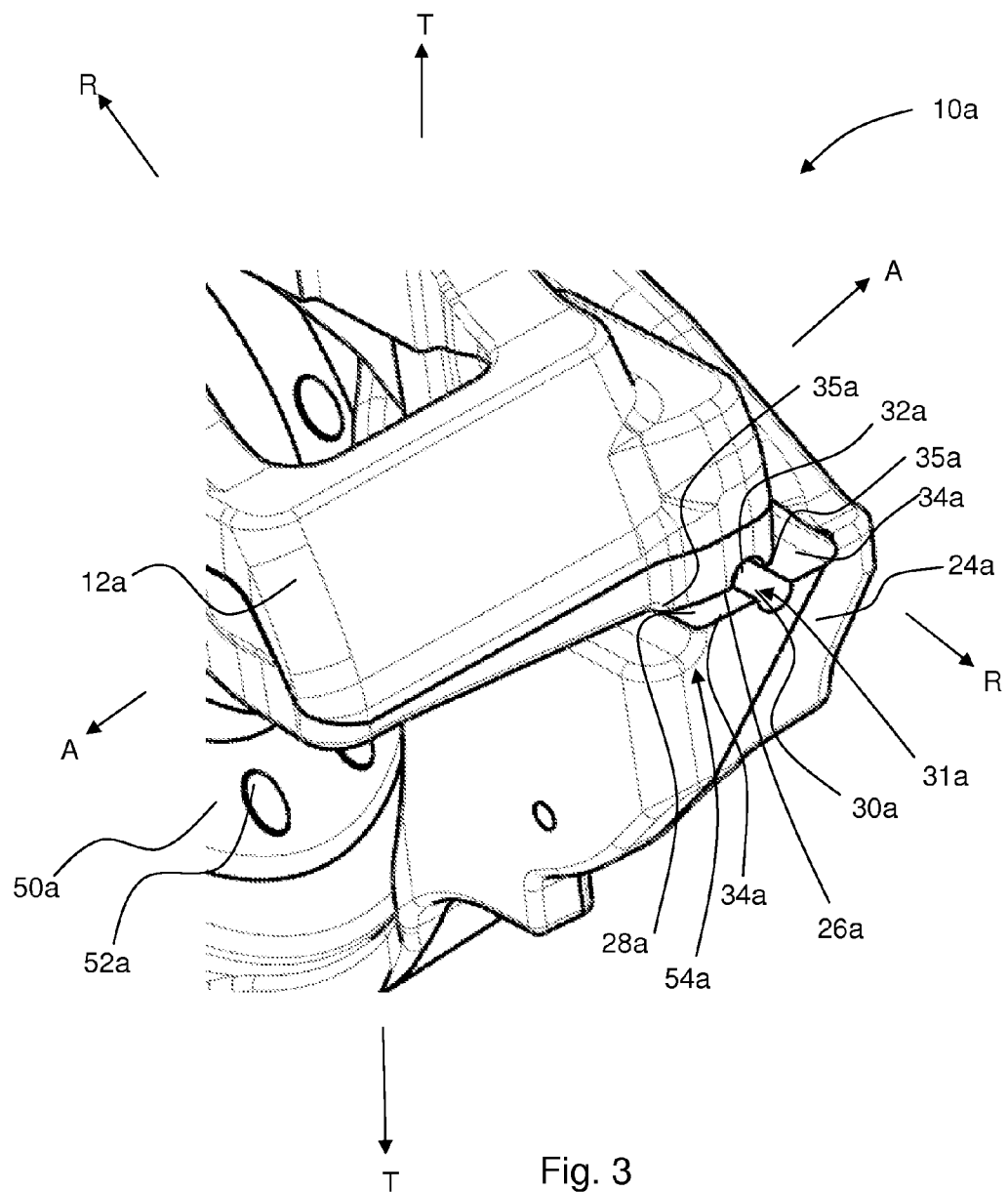
FIG. 3 shows a partial perspective view of a carrier and mount assembly according to an embodiment of the present invention.

Referring to FIG. 3, a carrier and mount assembly of a disc brake according to an embodiment of the present invention is indicated generally at 10a. Like parts are labeled by like numerals in the description below, but with differing suffix letters.

A carrier 12a is positioned on a mount 24a. In this embodiment the mount is an adapter plate of the type for mounting to a drum brake. A mount of this type (mount 24d) is shown more clearly in another embodiment illustrated in FIGS. 8 and 9. The mount 24a/d has a circular central section 50a/d with holes 52a/d spaced circumferentially around the central section. The holes 52a/d can receive bolts (not shown) to bolt the mount to a mounting for a drum brake. An upper end of the mount 24a/d (as viewed in the figures) is provided with a support 54a/d that extends chordally each side of the central section for supporting a carrier 12a/d.

The support 54d comprises a planar surface 28a that abuts a planar surface 26a of the carrier. The planar surfaces 26a and 28a are positioned on either side of the carrier 12a and the mount 24a, i.e. chordally either side of an axle, and are coplanar. However, in alternative embodiments the planar surfaces 26a, 28a on each side of the carrier 12a and mount 24a may be angled with respect to each other. In such embodiments the planar surfaces 26a, 28a at one side may be substantially perpendicular to a planar surfaces 26a, 28a at the other side of the carrier 12a and mount 24a.

Figure 6:
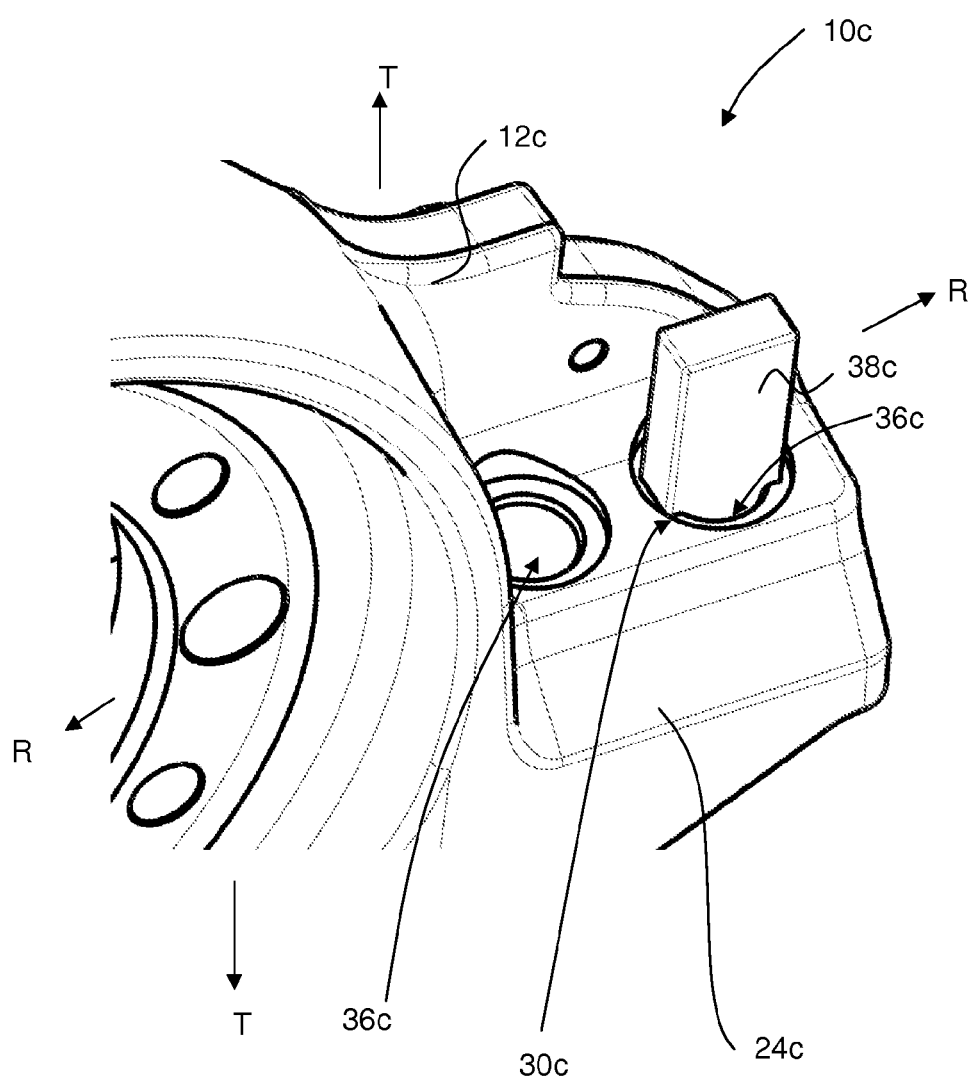
FIG. 6 shows the carrier and mount assembly of claim 6 at an intermediate step in a method of assembly according to an embodiment of the present invention.
Figure 7:
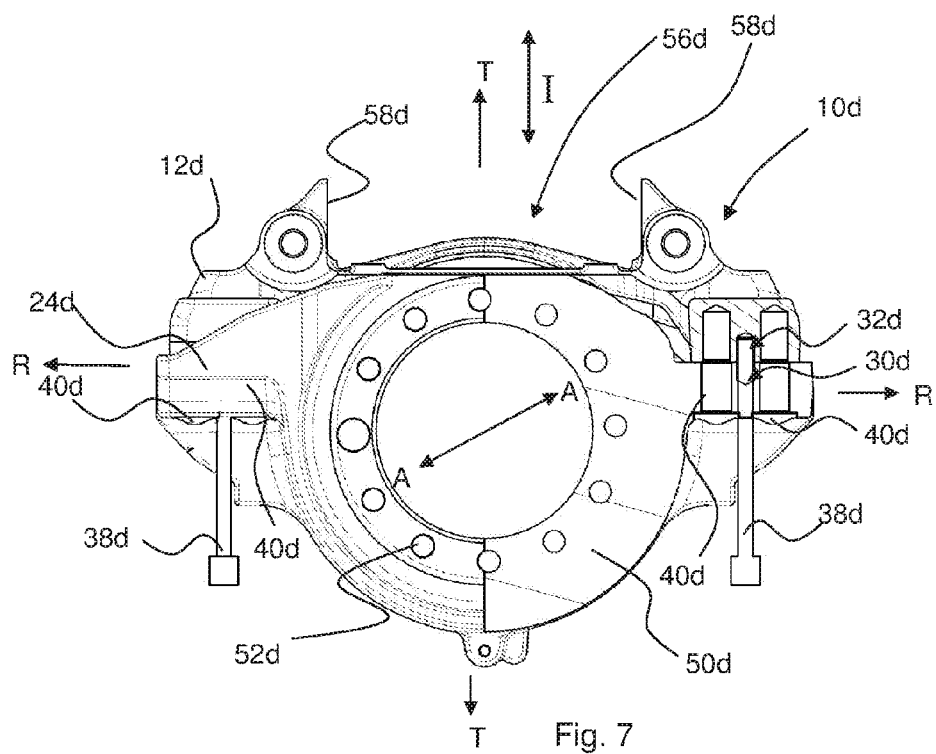
FIG. 7 shows a front view of a carrier and mount assembly according to an embodiment of the present invention.
Figure 8:
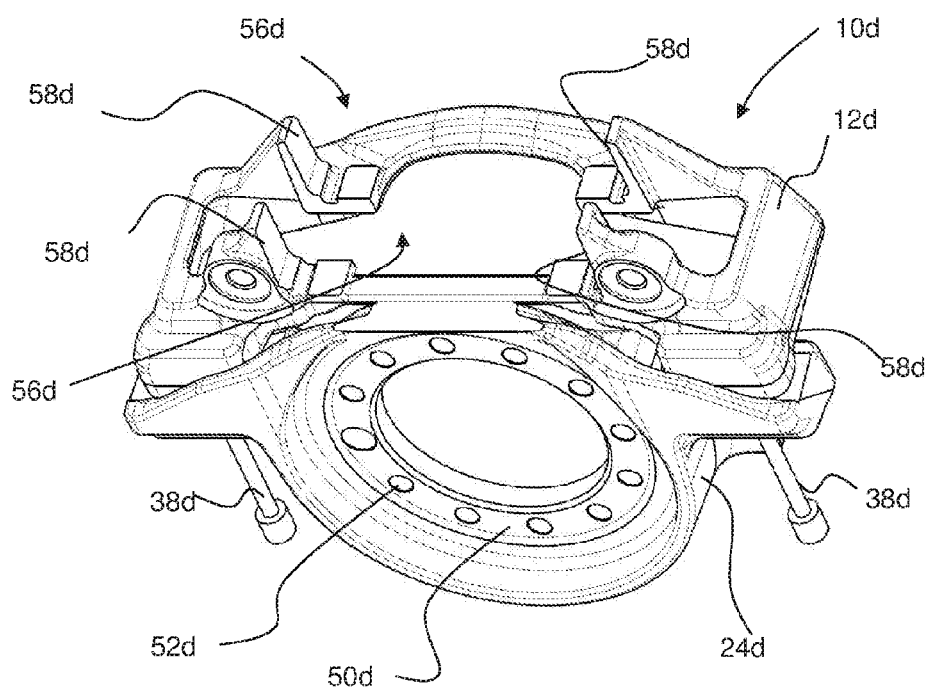
FIG. 8 shows a perspective view of the carrier and mount assembly of FIG. 7.

Referring to FIGS. 3 to 10, throughout the present detailed description directions of features of the mount 24a, 24b, 24c, 24d, 24e and/or carrier 12a, 12b, 12c, 12d, 12e are referred to with respect to a rotor of a disc brake, of which the carrier may be a component thereof. Direction A is a direction through an axis of rotation of a rotor of a disc brake and is substantially perpendicular to a plane substantially parallel to a planar face of the rotor, referring to FIG. 8, in this embodiment the rotor (not shown) of a disc brake will be positioned to be in a plane substantially parallel to the plane defined by the circular central section 50d. Direction T is a direction tangential to a circle described by rotation of a rotor of a disc brake (which in the embodiment shown in FIG. 8 is also tangential to the central circular section 50d) and generally parallel or aligned with a direction of insertion or removal of a friction element into or from the carrier.

Referring to FIGS. 7 and 8, one friction element is inserted into one of an upper rectangular receiving region or window 56d on each axial side of the carrier, and the direction of insertion or removal of a friction element is, in this embodiment, aligned with two opposing sides 58d of the rectangular receiving region 56d and is indicated in FIG. 8 by arrow I. Direction R is a direction substantially perpendicular to both of the axes defined by direction A and direction T respectively (i.e. is generally aligned with a width of the carrier).

A location formation, in this embodiment a groove 32a, is formed in the planar surface 26a of the carrier and a location formation, in this embodiment a groove 30a is formed in the planar surface 28a of the mount 24a. The grooves 30a, 32a are linear, longitudinal grooves each with a semi-circular cross section. The grooves 30a, 32a extend in the direction R. In this embodiment, the groove 30a, 32a in the carrier and the mount are positioned such that when the carrier is correctly positioned with respect to the mount the grooves are coaxially aligned and form a conjoined location formation. In this embodiment, the conjoined location formation is a channel with a circular cross section.

A seat 34a is machined on either side of the groove 30a and the groove 32a. Such a machined seat 34a provides a surface profile and roughness correct for more accurate alignment of the two grooves 30a and 32a, and consequently more accurate alignment of the carrier with respect to the mount.

To attach the carrier 12a to the mount 24a, the carrier is correctly positioned with respect to the mount, such that the groove 30a of the mount is aligned with the groove 32a of the carrier. A locator, in this embodiment a dowel (not shown in FIG. 3), is then positioned in the conjoined locator channel 31a. The dowel is a close fit to the locator channel 31a, a close fit may equate to a maximum clearance of 0.1 mm. The carrier is then attached to the mount using fasteners (not shown in FIG. 3), where in this embodiment the fasteners are bolts. The bolts screw from underneath the mount, with respect to the orientation of the carrier and mount assembly 10a shown in FIG. 3, into the carrier. In alternative embodiments, any other suitable method of attaching the carrier to the mount may be used, for example welding.

During the step of screwing the bolts into the mount 24a and carrier 12a, the dowel maintains the carrier and mount in correct alignment in both the direction T and the direction R. In this embodiment, the dowel is removed from the assembly ready for normal use of the carrier and mount, i.e. mounted to an axle of a vehicle. However, in alternative embodiments the dowel may remain positioned in the conjoined channel 31a during normal use.

Figure 4:
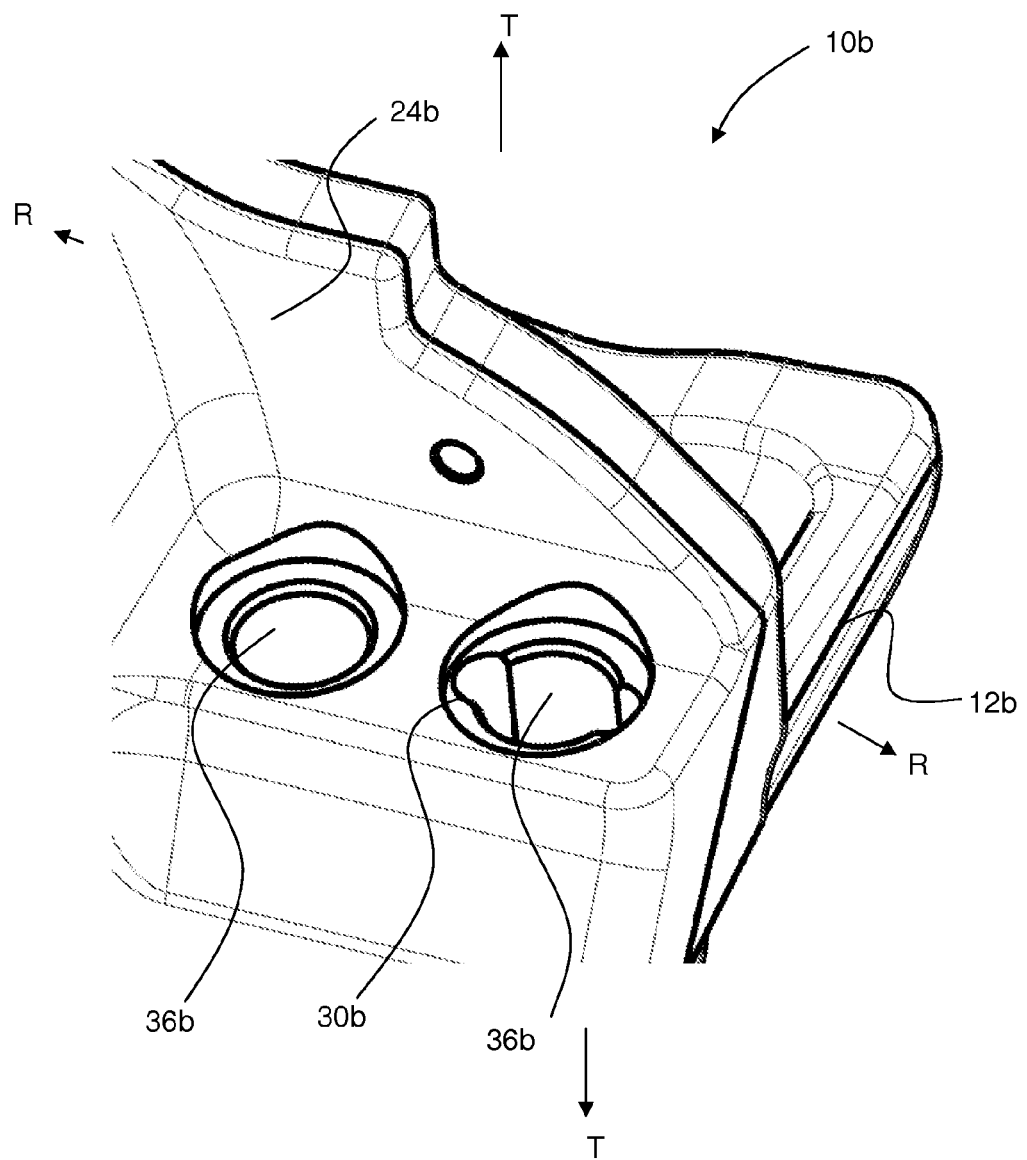
FIG. 4 shows a carrier and mount assembly according to another embodiment of the present invention.
Figure 5:
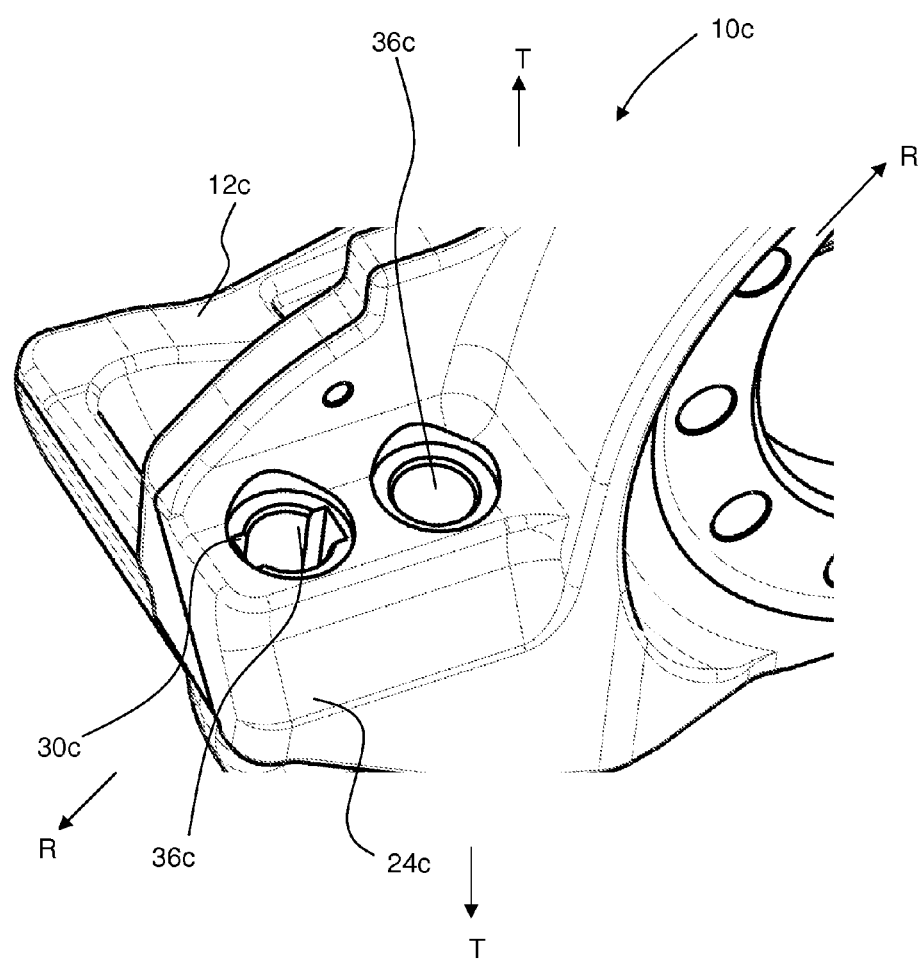
FIG. 5 shows a carrier and mount assembly according to a further embodiment of the present invention.

Alternative embodiments are shown in FIGS. 4 to 6. In these figures the carrier and mount assemblies 10b, 10c are viewed from below the assembly, with respect to the positioning of the embodiment shown in FIG. 3. In these embodiments, the carrier 12b, 12c is positioned on a mount 24b, 24c. A planar surface of the carrier abuts a planar surface of the mount 24b, 24c (the planar surfaces are not visible in the Figures, but the positioning of the carrier and mount is similar to that shown in FIG. 3).

Four bores 36b, 36c (only two of which are visible) are formed in the mount 24b, 24c and the carrier 12b, 12c each for receiving a bolt to attach the carrier to the mount. Two of the bores 36b, 36c are positioned at one side of the assembly 10b, 10c and the other two bores (not shown in FIGS. 6 to 8) are spaced from said two bores to be positioned at an opposite side of the assembly 10b, 10c (i.e. an opposite side of an axle when the mount is attached thereto). The bores 36b, 36c longitudinally extend through the mount and carrier in the direction T. In this embodiment, the bores 36b, 36c extend entirely through the mount 24b, 24c and the carrier 12b, 12c. When the carrier 12b, 12c is positioned correctly with respect to the mount 24b, 24c the bore formed in the carrier is coaxially aligned with the bore formed in the mount.

Two location formations (only one is shown in the figures), in these embodiments a slot 30b, 30c, is formed in the mount 24b, 24c and the carrier 12b, 12c. In these embodiments, the slot 30b, 30c extends through both the mount 24b, 24c and the carrier 12b, 12c. Each slot 30b, 30c is coaxially aligned with one of the four bores 36b, 36c. In this embodiment, the bore 36b, 36c is threaded for engagement with a fastener, but there is no thread provided on the slot 30b, 30c.

In the embodiment shown in FIG. 4 the slot 30b is substantially oval in shape and has a greater diameter than the bore 36b in the direction R, such that the slot protrudes from the profile of the bore at each side of the bore in the direction R.

In the embodiment shown in FIGS. 5 and 6, the slot 30c is substantially rectangular in shape and has a greater length than the diameter of the bore 36c in the direction R, such that the slot 30c protrudes from the profile of the bore 36c at each side of the bore in the direction R.

In alternative embodiments the slot may have any suitable shape that has a directional component in a direction parallel to the plane of the rotor.

Referring to FIG. 6, to mount the carrier 12c to the mount 24c, a dowel 38c is positioned in the slot 30c. The dowel 38c is a close fit to the slot 30c. In this embodiment the dowel 38c has a rectangular cross section, but in alternative embodiments the cross section of the dowel may be selected to correspond to the cross-section of the slot 30c.

In this embodiment, the dowel 38c is driven through the slot 30c as the bolt (not shown in FIG. 6) is screwed into the bore 36c, and exits through the opposite side of a slot 30c formed by the slot in the mount and the slot in the carrier. However, in alternative embodiments the dowel 38c may remain in a portion (e.g. an end portion) of the slot 30c. In such embodiments, the slot 30c may not extend entirely through the mount 24c and the carrier 12c, and instead extend entirely through one of the mount 24c or carrier 12c and only partially through one of the carrier 12c or mount 24c, respectively.

To attach the carrier to the mount, the carrier is positioned on the mount. The dowel is then positioned in the slot, to ensure correct alignment. A bolt is then screwed into the adjacent, slot-free bore. Subsequently, a bolt is screwed into the bore coaxial with the slot. As the bolt is tightened the dowel is driven through the slot. In alternative embodiments, the bolts may be tightened in a different order or simultaneously.

A further alternative embodiment of a carrier and mount assembly of a disc brake is indicated generally at 10d in FIGS. 7 and 8. A carrier 12d is positioned on a mount 24d. A planar surface of the carrier 12d abuts a planar surface of the mount 24d (the planar surfaces are not visible in FIGS. 7 and 8, but the positioning of the mount with respect to the carrier is similar to that shown in FIG. 3).

A location formation, in this embodiment a hole 30d extends entirely through the mount 24d and a hole 32d extends partially through the carrier 12d. The holes 30d, 32d are linear holes positioned to have a longitudinal length in the direction T. In this embodiment a hole 30d, 32d is positioned on either side (i.e. each side of an axle when attached to an axle) of the mount and the carrier. In this embodiment the hole 30d, 32d is threaded, but in alternative embodiments the holes 30d, 32d do not have a threaded surface. When the carrier 12d is correctly positioned on the mount 24d the hole 30d of the mount 24d is coaxially aligned with the hole 32d of the carrier 12d. In alternative embodiments, the hole 30d may extend partially through the mount 24d and the hole 32d may extend entirely through the carrier 12d.

To mount the carrier 12d to the mount 24d, a locator, in this embodiment a bolt 38d is screwed into each of the holes 30d, 32d. The bolt 38d is a close fit to the holes 30d, 32d. The bolts or pins may be plain or doppler (also known as "quick release") bolts or pins that utilize e.g. retractable ball bearing detents to releasably hold them in place, an example of a suitable pin is available from Speciality Fasteners and Components Limited of Totnes, Devon, UK, and is of the 420, 425, 620, 625, 13270 or 13275 series.

Four fasteners, in this embodiment bolts 40d are then screwed into the mount 24d and carrier 12d to attach the carrier 12d to the mount 24d. In this embodiment, the bolt 38d is then removed, but in alternative embodiments the bolt 38d may remain in position during use. In such embodiments the bolt provided would be shorter in length than the bolt shown in FIGS. 7 and 8.

Figure 9:
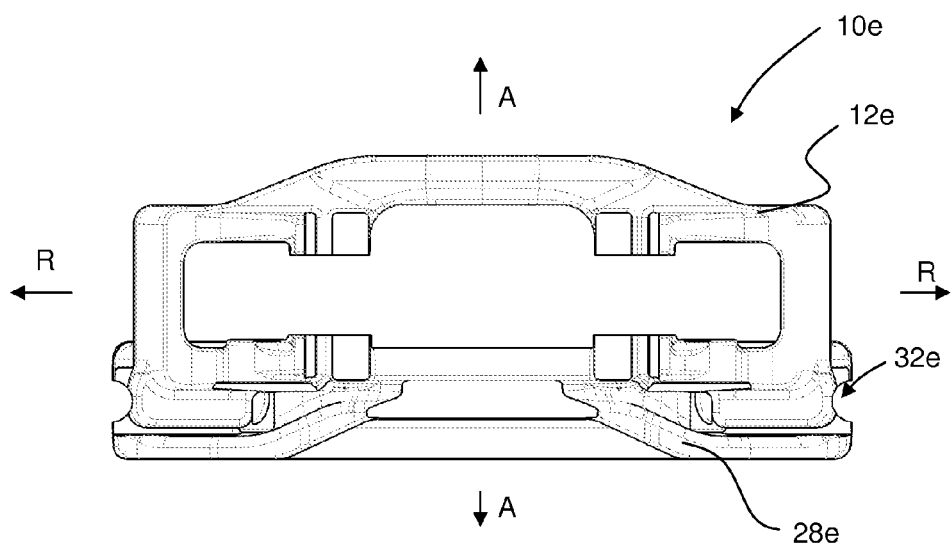
FIG. 9 shows a plan view of a carrier and mount assembly of a further embodiment of the present invention.
Figure 10:
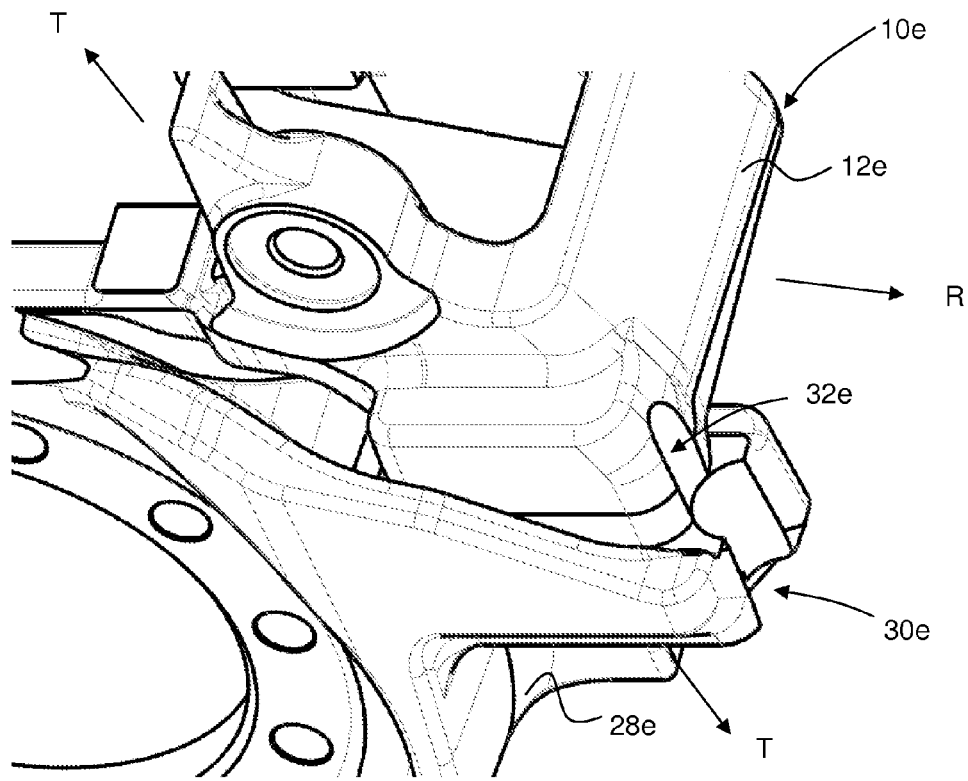
FIG. 10 shows a partial perspective view of the carrier and mount shown in FIG. 9.
Figure 11:
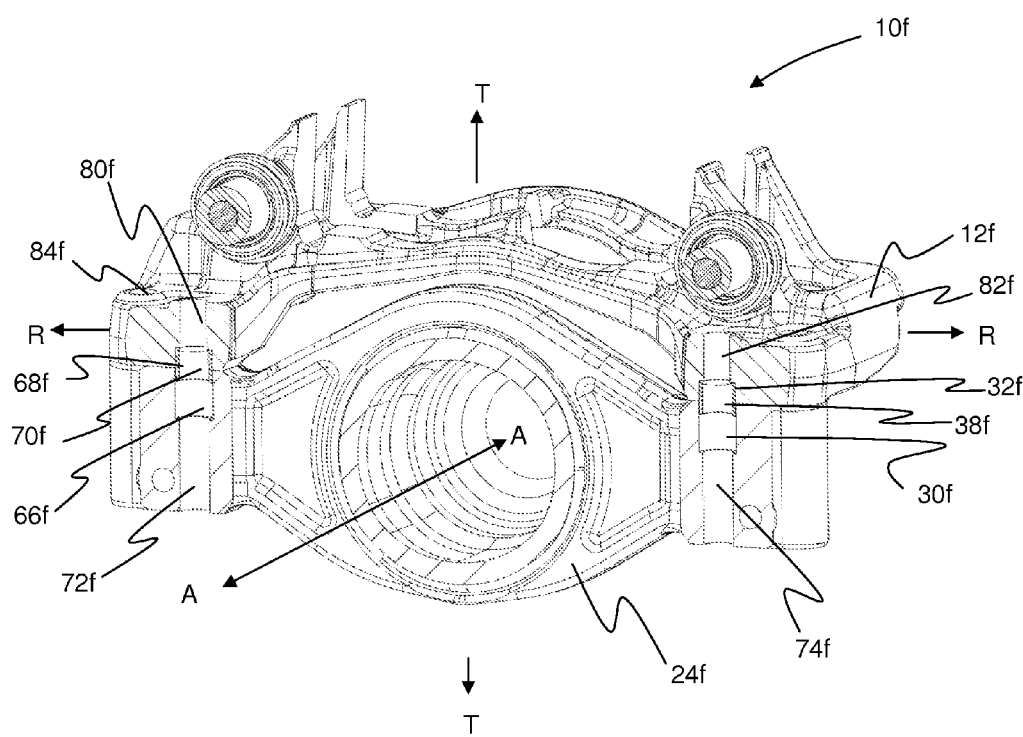
FIG. 11 shows a partially sectioned perspective view of a carrier and mount according to an alternative embodiment.
Figure 12:
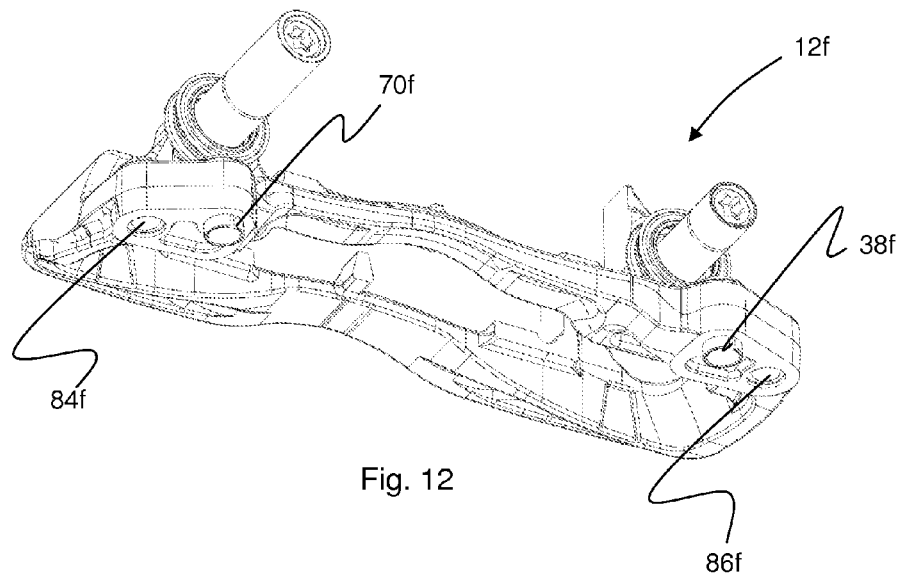
FIG. 12 shows a perspective view of a carrier of the carrier shown in FIG. 11.
Figure 13:
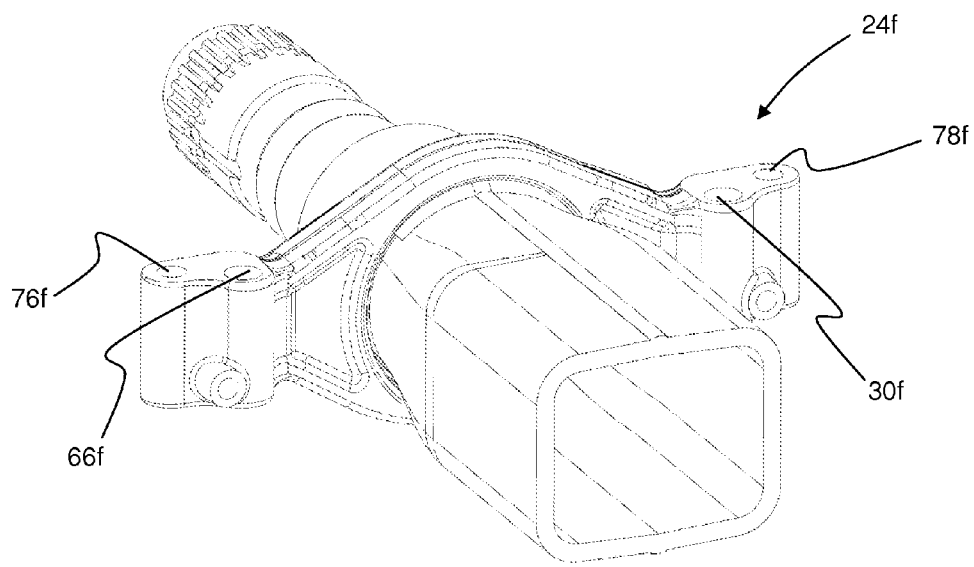
FIG. 13 shows a perspective view of a mount shown in FIG. 11.
Figure 14:
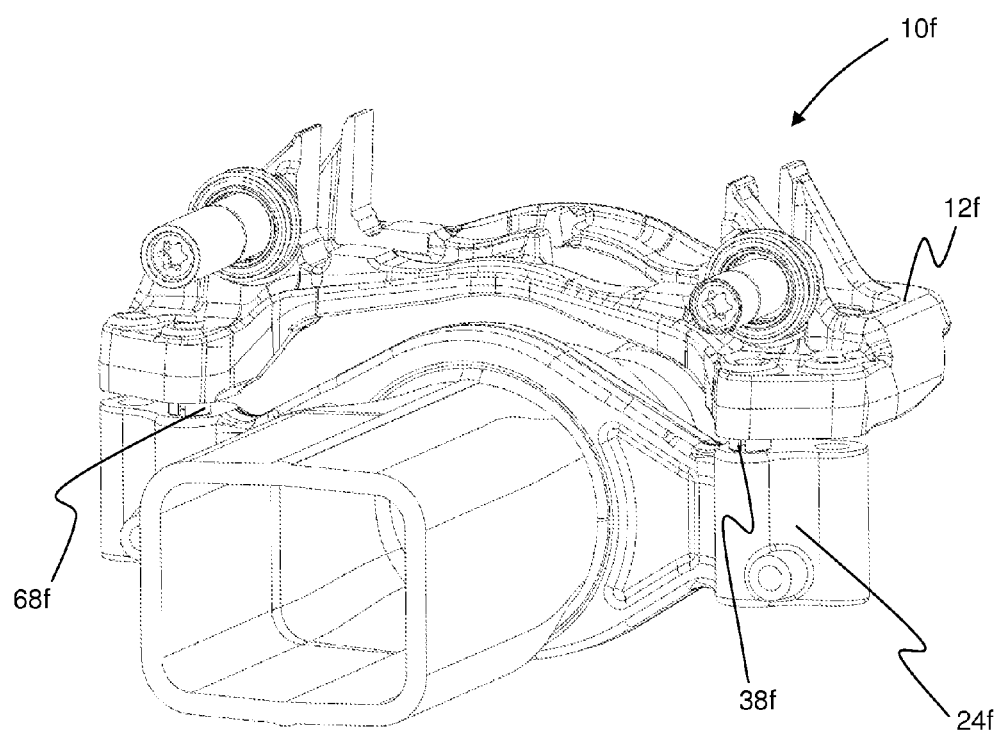
FIG. 14 shows a perspective view of the carrier and mount of FIG. 11 partially assembled.

A further embodiment is shown in FIGS. 9 and 10. In this embodiment, a carrier 12e is positioned on a mount 24e, such that a planar surface of the carrier is seated on a planar surface of the mount 24e (the positioning of the carrier, mount and planar surfaces is similar to that shown in FIG. 3 so will not be explained further here).

A location formation, in this embodiment a groove 30e is positioned on two sides of the mount 24e. The two said sides of the mount 24e are orientated in a plane having axes parallel to an axis of rotation of a rotor of a disc brake and parallel to a direction tangential to a rotation of the rotor of a disc brake. A groove 32e is positioned on two sides of the carrier.

The grooves 30e and 32e are linear grooves having a longitudinal length generally in a direction T tangential to a direction of rotation of a rotor of a disc brake. In this embodiment the grooves have a semi-circular cross section, but any appropriate cross section may be provided. In this embodiment the grooves are formed by milling.

To mount the carrier 12e to the mount 24e the groove 32e of the carrier 12e is positioned in coaxial alignment with the groove 30e of the mount 24e. A clamp having a locator component is positioned such that the locator component is positioned in the grooves 30e, 32e, and the carrier 12e is clamped to the mount 24e. Whilst the carrier 12e is clamped to the mount 24e, the carrier 12e is attached to the mount 24e, for example using fasteners such as bolts.

In this embodiment, the clamp applies the clamping force in a direction substantially perpendicular to the location formations and substantially perpendicular to an axis of rotation of the rotor, i.e. in the direction R.

A further embodiment is shown in FIGS. 11 to 14. In this embodiment, a carrier 12f is positioned on a mount 24f, such that a planar surface of the carrier is seated on a planar surface of the mount 24f (the positioning of the carrier, mount and planar surfaces is similar to that shown in FIG. 3 so will not be explained further here).

The mount 24f includes four through holes 72f, 74f, 76f, 78f, and the carrier 12f includes four through holes 80f, 82f, 84f and 86f. When the carrier 12f is mounted to the mount 24f the through holes of the mount are coaxial with the through holes of a carrier to receive a fastener (not shown in FIGS. 11 to 14). The four holes 72f, 76f, 74f, 78f of the mount are arranged so that two holes are on either side of a plane defined by an axis extending substantially parallel to a direction T of insertion or removal of a friction element into or from the carrier, and an axis of rotation of a rotor of a disc brake. The four holes of the carrier 80f, 82f, 84f, 86f are similarly arranged.

The holes 72f, 74f in the mount nearest an axis of rotation of a rotor (for use with the carrier) include a section 66f, 30f having an enlarged diameter, and the holes 80f, 84f in the carrier nearest the axis of rotation of the rotor included a section 68f, 32f having an enlarged diameter. The section of the carrier having the enlarged diameter is positioned adjacent the section of the mount having an enlarged diameter when the carrier is mounted to the mount. One or more of the narrower section of the holes 72f, 74f, 80f, 82f is threaded to mate with a fastener, which in this embodiment is a threaded bolt. The enlarged diameter section is free from thread.

A bush 68f is positioned in the enlarged sections 68f, 66f on a leading side of the rotor (with respect to the usual direction of rotation of the rotor during use), and the bush 38f is positioned in the enlarged sections 32f, 30f on the on a trailing side of the rotor (with respect to the usual direction of rotation of the rotor during use). The bushes 38f, 68f are split bushes include a chamfered end nearest the mount, i.e. a leading end during assembly. The split bushes are made from spring steel.

The bush 38f forms a locator and the enlarged sections 30f and 32f form location formations. As such, the bush 38f is formed to be a transitional fit to the enlarged sections 30f and 32f. In the present embodiment, the outer diameter of the bush 38f is substantially equal to the outer diameter of the enlarged section 30f, 32f, but in alternative embodiments alternative transitional fits may be used, or the bush may have a relaxed outer diameter greater than the enlarged section 30f, 32f. A transitional fit may be a fit having a clearance of between 0 mm and 0.04 mm.

The bush 68f is a transitional fit to the enlarged section 68f of the carrier, but is a loose fit to the enlarged section 66f of the mount 24f. In this embodiment, there is a clearance between the bush 68f and the enlarged section 66f of the mount of approximately 0.07 mm, but in alternative embodiments the clearance may be greater or less than this. For example, a loose fit may refer to a fit having a clearance greater than 0.04 mm.

To mount the carrier 12f to the mount 24f, the bushes 38f, 68f are positioned in the enlarged sections 32f, 68f of the holes 82f, 80f. The carrier 12f is then seated on the mount and the bushes 38f, 68f are positioned in the enlarged sections 30f, 66f of the holes 74f, 72f of the mount 24f. The chamfer on the leading end of the bushes 38f, 68f eases insertion of the bushes into the enlarged sections of the mount. In the case of the bush 38f, the chamfer on the leading end provides a lead in to the hole that eases compression of the split bush 38f so that the bush can be more easily inserted into the enlarged section 30f. When in the enlarged section 30f, the split bush expands to have an outer diameter substantially equal to the outer diameter of the enlarged section 32f of the carrier and/or of the enlarged section 30f of the carrier.

Fasteners (not shown), in the present embodiment bolts, are then fastened through the holes 72f, 74f, 76f, 78f, 80f 82f, 84f, 86f in the carrier 12f and mount 24f to secure the carrier 12f to the mount 24f.

Advantageously, providing one bush that is a transitional or tight fit to the mount and one bush that is a loose fit to the mount eases assembly of the carrier and mount assembly 10f because alignment of the carrier to the mount is simplified. Assembly can be further simplified when the bush 38f is a transitional fit rather than the bush having a relaxed diameter greater than the diameter of the enlarged section.

Figure 15:
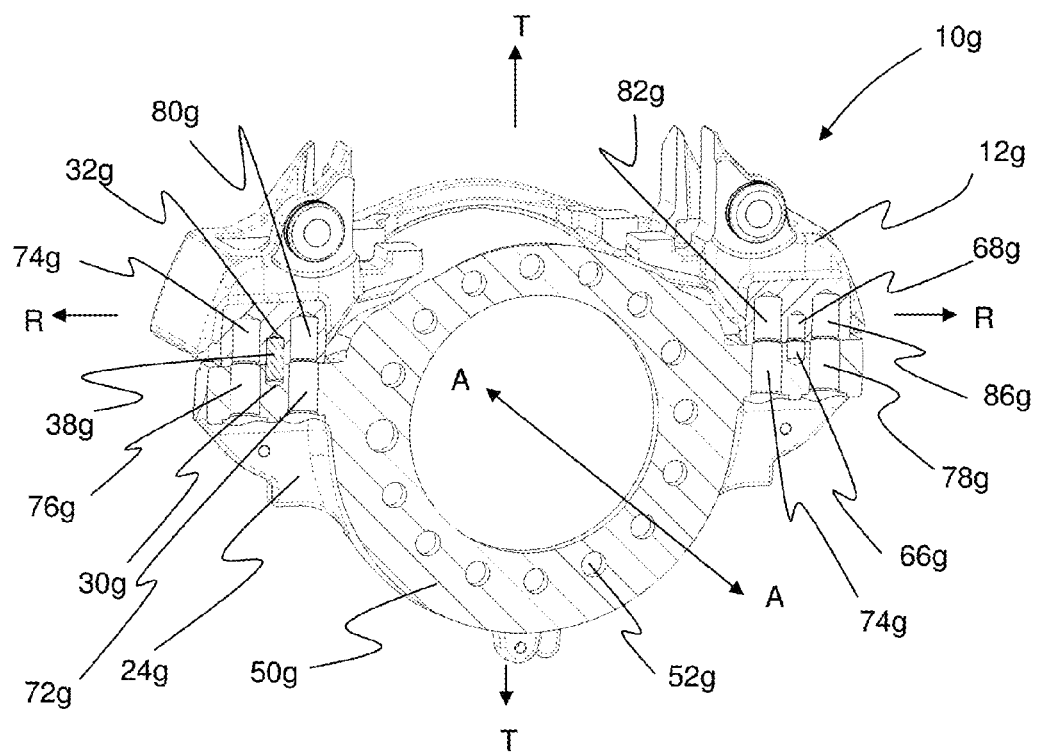
FIG. 15 shows a partially sectioned carrier and mount according to a further alternative embodiment.
Figure 16:
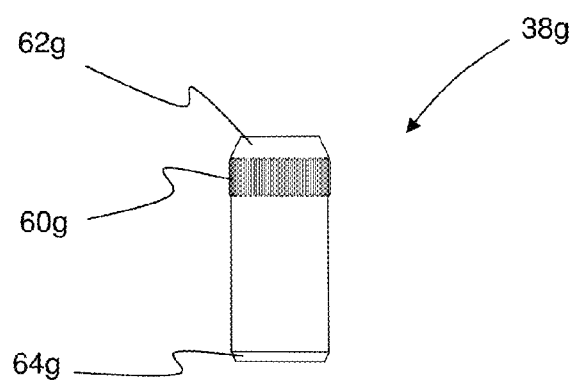
FIG. 16 shows a front view of a locator of the carrier and mount of FIG. 15.
Figure 17:
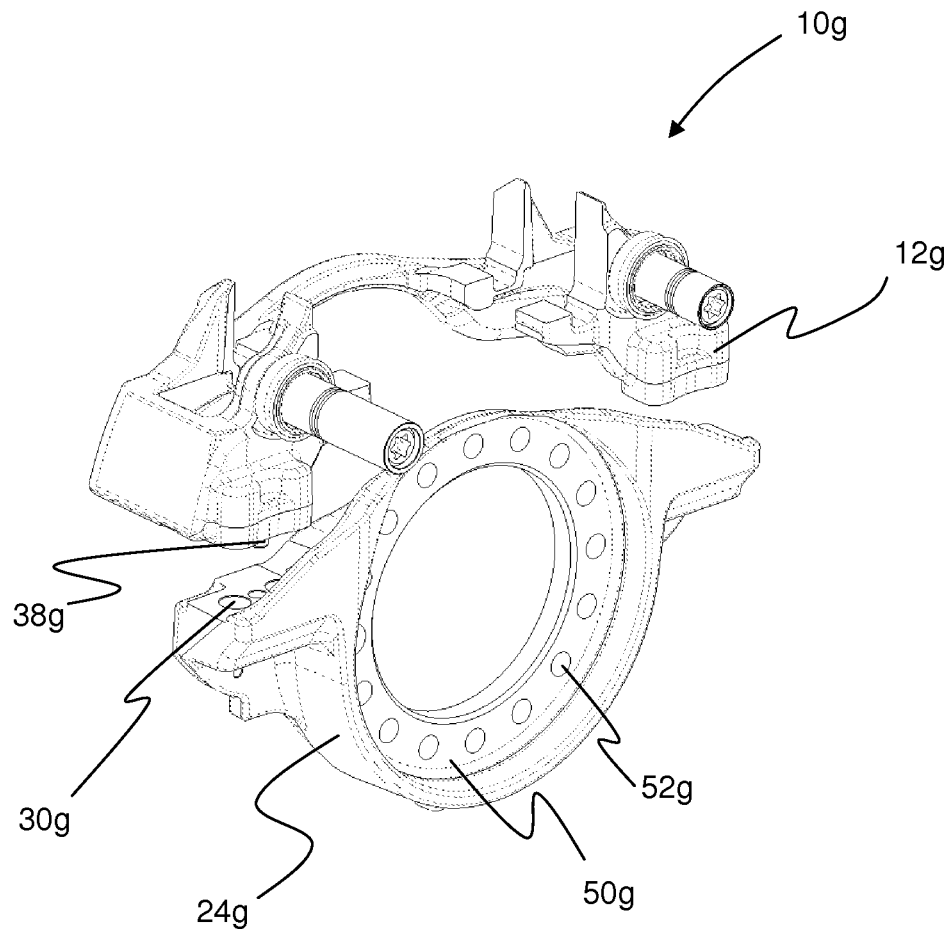
FIG. 17 shows a perspective view of a carrier and mount of FIG. 15 in a non-mounted state.

A further embodiment is shown in FIGS. 15 to 17. In this embodiment, a carrier 12g is positioned on a mount 24g, such that a planar surface of the carrier is seated on a planar surface of the mount 24g (the positioning of the carrier, mount and planar surfaces is similar to that shown in FIG. 3 so will not be explained further here).

A location formation, in this embodiment a hole 30g is positioned on one side of the mount 24g, i.e. to one side of a plane defined by an axis extending substantially parallel to a direction T of insertion or removal of a friction element into or from the carrier, and an axis of rotation of a rotor of a disc brake. The hole 30g extends partially through the mount 24g. A location formation, in this embodiment a hole 32g is positioned to be coaxial with hole 30g of the mount 24g, when the carrier 12g is mounted to the mount 24g.

A locator, in this embodiment a peg 38g is positioned to extend into the holes 30g and 32g. The diameter of the peg 38g, and the diameter of the hole 32g in the carrier 12g and the diameter of the hole 30g in the mount 24g is such that the peg 38g is a transitional fit to the carrier and mount when positioned in the holes 30g and 32g. The peg 38g is positioned on a trailing side of the rotor.

The peg 38g is shown in more detail in FIG. 16. The peg 38g is substantially cylindrical. In the present embodiment, the peg 38g has a knurled portion 60g extending circumferentially around the peg. In the present embodiment, the knurled portion 60g is positioned in the hole 32g of the carrier 12g, but in alternative embodiments the knurled portion 60g may be positioned in the hole 30g of the mount 24g. The knurled portion 60g and the hole 32g of the carrier 12g are dimensioned such that the knurled portion is an interference fit with the carrier 12g when inserted in the hole 32g. The peg 38g includes a chamfered edge 62g, 64g at each axial extent thereof to ease positioning of the peg 38g in the holes 30g and 32g.

A hole 66g is formed in the mount 24g and is positioned on the opposite side to the hole 30g of a plane defined by an axis extending substantially parallel to a direction T of insertion or removal of a friction element into or from the carrier, and an axis of rotation of a rotor of a disc brake. A hole 68g is formed in the carrier 12g and is positioned on an opposite side to the hole 32g of a plane defined by an axis extending substantially parallel to a direction of insertion or removal of a friction element into or from the carrier, and an axis of rotation of a rotor of a disc brake. The holes 66g and 68g are dimensioned to be substantially the same size as the holes 30g and 32g. This means that either hole 30g and 32g or holes 66g and 68g can be used as location formations dependent upon which side of an axle the brake is mounted.

To mount the carrier 12g to the mount 24g, the peg 38g is positioned in the hole of the 32g of the carrier 12g. The carrier 12g is then seated on the mount and the peg 38g is positioned in the hole 30g of the mount 24g. A fastener is then engaged with the threaded holes 78g and 86g positioned on an opposite side to the locator of a plane defined by an axis extending substantially parallel to a direction T of insertion or removal of a friction element into or from the carrier, and an axis of rotation of a rotor of a disc brake, and spaced furthest from said plane. A further fastener is then engaged with the threaded holes 74g and 82g on an opposite side to the locator of a plane defined by an axis extending substantially parallel to a direction T of insertion or removal of a friction element into or from the carrier, and an axis of rotation of a rotor of a disc brake, and spaced nearest to said plane. Then a fastener is engaged with the holes 80g, 72g, 74g, 76g on the same side as the locator of a plane defined by an axis extending substantially parallel to a direction T of insertion or removal of a friction element into or from the carrier, and an axis of rotation of a rotor of a disc brake. The described method of mounting the carrier to the mount has been found to be preferred for reducing taper pad wear. However, in alternative embodiments the fasteners may be fastened in an alternative order.

Advantageously, only providing a locator on one side of the carrier and mount assembly means that assembly is eased because there is no need to align two tight fitting locators. It has been found that the provision of only one locator is sufficient to correctly align the mount and carrier.

Advantageously all of the above described embodiments permit the carrier to be correctly positioned with respect to the mount in both a direction parallel to an axis of rotation of a rotor of a disc brake and in a plane parallel to a plane of a rotor of a disc brake. This means that when the disc brake having said mount and carrier are mounted to an axle of a vehicle, friction elements of the disc brake are substantially aligned with the rotor alleviating the problem of taper pad wear associated with disc brakes of the prior art.

In embodiments where the locator is removed, removal of the locator for normal use can reduce the weight of the disc brake in normal use.

Furthermore, the location formations are easily machined and formed.

Although the invention has been described above with reference to one or more preferred embodiments, it will be appreciated that various changes or modifications may be made without departing from the scope of the invention as defined in the appended claims. For example, the grooves or holes may have any appropriate cross section. Alternatively or additionally, the grooves may have a curved or stepped profile in a longitudinal direction.

In other embodiments, the mount may be a bracket secured by welding to an axle. In alternative embodiments, the mount may be part of a steering knuckle on a steered axle. The carrier is shown in this embodiment as not having a beam connecting the opposing sides 58*d* of the rectangular receiving region, but in other embodiments such a beam may be provided.

In further alternative embodiments the locator is tapered. For example, the locator may be a dowel having tapered side walls. In some embodiments the dowel may be conical in shape. In such embodiments the location formations may also be tapered to accommodate the tapered locator. Advantageously, a taper can guide the locator into correct position in the location formation, which can guide the carrier into correct alignment with the mount. Although the present invention is primarily applicable to the mounting of carriers the applicant has recognized that the arrangements described in each of the embodiments may also be applicable to the mounting of calipers directly to mounts if such calipers are fixed (e.g. in conjunction with an axially sliding rotor).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A carrier and mount assembly for a heavy vehicle disc brake, the assembly comprising:
    a carrier having a first location formation formed therein;
    a mount having a second location formation formed therein, wherein the second location formation is aligned with the first location formation; and
    a locator positioned in the first and second location formations to enable the carrier and mount to be assembled in the correct position when mounting the carrier on the mount, the locator remaining positioned in the first and second location formations during normal use of the brake;
    wherein the locator is at least a close fit to the first and second location formations;
    wherein the first location formation is a first closed hole formed in the carrier and the second location formation is a second closed hole formed in the mount, and the locator is a peg positioned in the first location formation and the second location formation; and
    wherein the peg comprises a knurled portion positioned in one of the carrier and the mount, and the knurled portion is dimensioned to be an interference fit with the carrier.

2. The carrier and mount assembly according to claim 1, wherein the first location formation and the second location formation are positioned to extend in a direction substantially parallel to a direction of insertion or removal of a friction element into or from the carrier.

3. The carrier and mount assembly according to claim 1, wherein the peg is an elongate cylindrical member with a first end and a second opposed end, the first end positioned adjacent to an end of the first closed hole and inside the carrier, the second opposed end positioned adjacent to an end of the second closed hole and inside the mount.

4. The carrier and mount assembly according to claim 1, wherein the carrier is mounted to the mount via two or more fasteners that extend in a direction substantially parallel to a direction of insertion or removal of a friction element into or from the carrier.

5. The carrier and mount assembly according to claim 4, wherein the carrier comprises two holes arranged such that one hole is positioned on either side of a plane defined by an axis extending substantially parallel to the direction of insertion or removal of the friction element into or from the carrier, and an axis of rotation of a rotor of a disc brake, and wherein the mount comprises two holes positioned to be substantially coaxial with the two holes of the carrier, and wherein one of the two or more fasteners extends through corresponding holes in the carrier and mount for mounting the carrier to the mount.

6. The carrier and mount assembly according to claim 5, wherein the carrier comprises two further holes arranged such that one further hole is positioned on either side of the plane defined by the axis extending substantially parallel to the direction of insertion or removal of the friction element into or from the carrier, and the axis of rotation of the rotor of the disc brake, and wherein the mount comprises two further holes positioned to be substantially coaxial with the two further holes of the carrier, and wherein one of the two or more fasteners extends through corresponding further holes of the carrier and the mount for mounting the carrier to the mount.

7. The carrier and mount assembly according to claim 6, wherein the two holes of the carrier and the mount, the two further holes of the carrier and the mount, and the first and second location formations are arranged in line in a direction substantially perpendicular to the axis of rotation of the rotor of the disc brake, and substantially perpendicular to a direction substantially parallel to the direction of insertion or removal of the friction element into or from the carrier.

8. The carrier and mount assembly according to claim 7, wherein the first location formation is positioned between one of the two holes of the carrier and one of the two further holes of the carrier, and the second location formation is positioned between another of the two holes of the carrier and another of the two further holes of the carrier.

9. The carrier and mount assembly according to claim 1 wherein the first closed hole of the first location formation extends only partially through the carrier; and
    wherein the second closed hole of the second location formation extends only partially through the mount.

10. The carrier and mount assembly according to claim 1 wherein the peg is provided as a cylindrical member with a first end and a second opposed end, one of the ends defining the knurled portion, the first end defining a first chamfered edge, the second end defining a second chamfered edge, the first and second ends of the peg having a common diameter;
   wherein the first end of the peg is received within the first location formation; and
   wherein the second end of the peg is received within the second location formation.

11. The carrier and mount assembly of claim 10 wherein the knurled portion extends circumferentially around and outwardly from the one of the ends of the peg.

12. The carrier and mount assembly of claim 1 wherein the carrier has a third location formation formed therein;
   wherein the mount has a fourth location formation formed therein, the fourth location formation alignable with the third location formation in the carrier;
   wherein the first location formation and the third location formation are on either side of a plane defined by an axis extending substantially parallel to a direction of insertion or removal of a friction element into or from the carrier, and an axis of rotation of a rotor of a disc brake; and
   wherein the locator is the sole locator for the carrier and mount assembly.

13. A method of mounting a carrier of a disc brake to a mount, the method comprising:
   providing a carrier to be mounted having a first location formation formed as a closed hole in the carrier;
   providing a mount having a second location formation alignable with the first location formation, the second location formation formed as a closed hole in the mount;
   positioning a locator in the first and second location formation prior to mounting the carrier to the mount, so as to support the carrier in alignment with respect to the mount so as to correctly position the carrier with respect to the mount; and
   mounting the carrier to the mount;
   wherein the locator remains positioned in the first and second location formations during normal use of the disc brake;
   wherein the first and second location formations are formed to be a close fit with the locator, and the locator is a peg positioned in the first location formation and the second location formation; and
   wherein said peg comprises a knurled portion positioned in one of the carrier and the mount, and the knurled portion is dimensioned to be an interference fit with the carrier.

14. The method according to claim 13, wherein the carrier has a third location formation and the mount has a fourth location formation alignable with the third location formation in the carrier and the method further comprising the step of:
   positioning a second locator in the third and fourth location formations prior to mounting the carrier to the mount, so as to further support the carrier in alignment with respect to the mount.

15. The method according to claim 13 wherein the carrier has a third location formation and the mount has a fourth location formation alignable with the third location formation in the carrier; and
   wherein the carrier is mounted to the mount without another locator positioned in the third and fourth locating formations.

16. A carrier and mount assembly for a heavy vehicle disc brake, the assembly comprising:
   a carrier having a first location formation formed therein,
   a mount having a second location formation formed therein, wherein the second location formation is aligned with the first location formation; and
   a locator positioned in the first and second location formations to enable the carrier and mount to be assembled in the correct position when mounting the carrier on the mount and to enable the carrier and the locator remaining positioned in the first and second location formations during normal use of the disc brake, wherein the locator is at least a close fit to the first and second location formations.

17. A carrier and mount assembly for a heavy vehicle disc brake, the assembly comprising:
   a carrier having a first location formation formed therein and a third location formation formed therein, wherein the first location formation and third location formation are on either side of a plane defined by an axis extending substantially parallel to a direction of insertion or removal of a friction element into or from the carrier, and an axis of rotation of a rotor of a disc brake;
   a mount having a second location formation formed therein and a fourth location formation formed therein, wherein the first and second locations are alignable and the third and fourth locations are alignable when the carrier is mounted to the mount; and
   a locator positioned in one of the first and second location formations and the third and fourth location formations to enable the carrier and mount to be assembled in the correct position when mounting the carrier on the mount, the locator remaining positioned in one of the first and second location formations and the third and fourth location formations during normal use of the disc brake;
   wherein the first and second location formations are closed holes and are sized to receive the locator such that the locator is at least a close fit to the first and second locations formations; and
   the third and fourth location formations are closed holes and are sized to receive the locator such that the locator is at least a close fit to the third and fourth location formations.

18. The carrier and mount assembly according to claim 17 wherein the locator is a peg comprising a knurled portion configured to be positioned in one of the respective location formations in the carrier and the mount, wherein the knurled portion is dimensioned to be an interference fit with the carrier, the peg having a first end and a second opposed end, each end defining a chamfered edge about a common diameter of the peg, wherein the first end is positioned inside the carrier and the second end is positioned inside the mount.

19. The carrier and mount assembly according to claim 17 wherein the locator is the sole locator such that the other of the first and second location formations and the third and fourth location formations are empty when the carrier and mount are assembled in the correct position.

20. The carrier and mount assembly according to claim 18 further comprising:
   a first pair of fasteners and a second pair of fasteners connecting the carrier to the mount, each pair of fasteners on either side of the plane;
   wherein the first pair of fasteners comprises a first fastener and a second fastener, the first and second location formations positioned between the first and second fasteners and containing the locator; and wherein the second pair of fasteners comprises a third fastener and a fourth fastener, the third and fourth location formations positioned between the third and fourth fasteners.

* * * * *